(12) United States Patent
Humphrey

(10) Patent No.: US 8,577,821 B1
(45) Date of Patent: Nov. 5, 2013

(54) NEUROMIMETIC HOMOMORPHIC PATTERN RECOGNITION METHOD AND APPARATUS THEREFOR

(76) Inventor: Thomas D. Humphrey, Anchorage, AK (US)

(*) Notice: Subject to any disclaimer, the term of this patent is extended or adjusted under 35 U.S.C. 154(b) by 669 days.

(21) Appl. No.: 12/799,041

(22) Filed: Apr. 16, 2010

(51) Int. Cl.
*G06F 15/18* (2006.01)

(52) U.S. Cl.
USPC ................................. 706/22; 704/202

(58) Field of Classification Search
USPC ........................................................ 706/22
See application file for complete search history.

(56) References Cited

U.S. PATENT DOCUMENTS

2002/0116196 A1* 8/2002 Tran .............................. 704/270

OTHER PUBLICATIONS

Nakada et al ("A Silicon Resonate-and-Fire Neuron Based on the Volterra System" 2005).*
Uysal et al ("Towards Spike-Based Speech Processing: A Biologically Plausible Approach to Simple Acoustic Classification" 2008).*

* cited by examiner

*Primary Examiner* — Lut Wong
(74) *Attorney, Agent, or Firm* — Michael J. Tavella

(57) ABSTRACT

A method and apparatus for encoding the amplitude of frequency signals, into a temporal electrical spike pattern and a method for decoding the generated pattern by recognizing and classifying it with a correlating (associative pattern recognition) neuron like device. The first part of the system takes signals and converts their amplitude into a set of timed pulses. The timing of that pulse is a function of the amplitude of the incoming signal. Once a series of timed pulses have been created, they can be sent to a decoder. The decoder circuit uses bandpass filters and delays/gains a low pass summation. The recognition portion compares the timed input spikes with a known sample. Only when the input signals match the sample signals will the amplitudes be sufficient to meet the trigger threshold. When the output spike is generated, a pattern match has been found.

10 Claims, 13 Drawing Sheets

Amplitude to Relative Temporal Coding

Amplitude to Relative Temporal Coding

Amplitude to Relative Temporal Coding

Block Diagram of Neuromimetic Decoding Device

Graphical Representation of the Operation of the NDD
For Spike Train Array of Figure 8

Graphical Representation of the Operation of the NDD
For Non-matching Spike Train Array

NEUROMIMETIC HOMOMORPHIC PATTERN RECOGNITION METHOD AND APPARATUS THEREFOR

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to neuromimetic homomorphic pattern recognition methods and apparatuses and particularly to neuromimetic homomorphic pattern recognition method and apparatuses that utilize time delay signal filtering and additive encoding and decoding.

2. Description of the Prior Art

Pattern recognition is defined as the automated identification of shapes. Homomorphic describes pattern recognition between sets of similar form but of different structure. "Neuromimetic" is defined as a device that functions in a biologically plausible way like neurons, but can be implemented electrically i.e., mimicking that structure.

Many systems today simulate, or attempt to simulate neural processors. For example, speech recognition is currently done using digital signal processing, Fourier transforms, and Hidden Markov Model techniques, etc.

Neurons are comprised of three parts: dendrites, the soma and the axon. The input structure is known as the dendrites. The central processing unit of the cell is the soma. Individual neurons are essentially feed forward devices. Currents from synapses (inputs) at the distal ends of the dendrites are integrated and collected near the soma. When a certain threshold is met, the soma generates a spike and resets its input level. The output of the soma is on the axon. The axon itself is similar to a dendrite in that it has a reverse type tree structure. It is commonly accepted that the axon's sole purpose is to carry the output signal to other neurons. It connects to them through synapses. The most commonly accepted biological model for a neuron is called the "Integrate and Fire" neuron.

As described by neuroscientists, when the nerve impulse is transferred across a synapse into a dendrite it becomes a post-synaptic potential, either excitatory or inhibitory. Individual neurons can typically have 4000-10000 input connections. These currents are integrated in the dendrite. When they reach a predetermined threshold, the soma produces a spike (pulse) onto the axon and resets the voltage on the dendrite to initial conditions. There is also something called the refractory period, which is the short time after a spike is generated in which a new spike cannot be generated (typically 1-2 ms). The time frame for generation of a spike is typically less than 20 ms (assuming that the appropriate number of input spikes is received to reach the threshold. Typically, about one percent of the input connections would need to receive a spike within the appropriate processing time frame in order for an output spike to be generated at all.

Models of neuron dynamics have been used for more than 100 years. Numerous examples of electrical circuits have been designed to replicate the "threshold and fire" action of a neuron.

A typical prior art speech recognition system uses digital signal processing (DSP) to compute the Fourier transform (FT) of a broadband input signal such as a speech utterance. It uses DSP and FT to compute the cepstral coefficients of the frequency spectrum. These features are then typically input into a neural network (Hidden Markov Model) to identify the spoken phonemes in the input speech signal.

A cepstrum (pronounced /'kE;pstrom/) is the result of taking the Fourier transform (FT) of the decibel spectrum as if it were a signal. Its name was derived by reversing the first four letters of "spectrum". The cepstrum can be seen as information about rate of change in the different spectrum bands. It was originally invented for characterizing the seismic echoes resulting from earthquakes and bomb explosions. It has also been used to analyze radar signal returns. It is now used as the primary feature vector for decoding the human voice and musical signals. For these applications, the spectrum is usually first transformed using the Mel frequency bands. The result is called the Mel frequency cepstral coefficients, or MFCCs. In the Mel frequency spectrum, the frequency bands are positioned logarithmically as to more closely approximate the human auditory system. It is used for voice identification, pitch detection and much more. Recently it is also getting attention from music information retrieval researchers. The cepstrum separates the energy resulting from vocal cord vibration from the "distorted" signal formed by the rest of the vocal tract. The cepstrum is also related to homomorphic sound theory.

As a simple example of how speech sounds are recognized, FIG. 1 illustrates the frequency and amplitude (spectrum) of the sound "ah" articulated at a base frequency (pitch) of 100 Hz by a male. Notice the only frequencies present in the spectrum are at the fundamental pitch (100 Hz) and at harmonics which are even multiples of the pitch. Note, FIGS. 1, 2, and 3 are reproduced from the book Fundamentals of Musical Acoustics, by Arthur Benade, New York, Oxford University Press, 1976. FIGS. 1 and 2 appear on page 371. FIG. 3 appears on page 373.

In FIG. 2, the same sound is being produced by a female at the base pitch of 220 Hz. The only frequency components present are again harmonics of the base. The spectral pattern for the sound "Ah" is the same whether spoken by the male speaker at 100 Hz or spoken by the female speaker at 220 Hz. The sound "Ah" is characterized by a similarity of form in each case but of different structure (Homomorphic). If we heard both of these sounds being produced, we would agree that the same "Ah" vowel is being produced, even though the second speaker has a pitch twice as high and with fewer (and different) overall frequency harmonics formed.

FIG. 3 is a graph of the spectral pattern of the vowel sound "Ah". Note that the spectral pattern for the sound "Ah" is the same whether spoken by the male speaker at 100 Hz or spoken by the female speaker at 220 Hz.

BRIEF DESCRIPTION OF THE INVENTION

The instant invention has two parts. The first is a method and apparatus for encoding the amplitude of frequency signals, such as would be output from a bandpass filter bank, into a temporal electrical spike pattern. The second is a method for decoding the pattern by recognizing and classifying it with a correlating (associative pattern recognition) neuron like device. Thus, the invention is a method and device to encode and decode spike train arrays using a pattern recognition (correlation) device modeled after a biological neuron.

The first part of the system takes signals and converts their amplitude into a set of timed pulses. This can be done a number of ways. For example, a given signal is filtered and summed with a timing signal. The output of the summer is then run through a Schmitt Trigger, which compares it to a Threshold voltage. When the amplitude meets the threshold, the trigger fires and releases a pulse. The timing of that pulse is a function of the amplitude of the incoming signal. Once a set of timed pulses have been created, they can be sent to a decoder. The pulse set is created by a multiplicity of encoders operating in a parallel arrangement.

The decoder circuit starts at the synapse—dendrite distal end. Analogous to the biological neuronal arrangement described above, the pre-synaptic axon and synapse carries a nerve pulse to the synapse. When the spike is transferred across the synapse to the dendrite, it evokes a post-synaptic potential (PSP). This is achieved electrically by a multiplicity of bandpass filters, which are arranged like synaptic dendrite connections to receive the incoming pulses from selected outgoing lines of the encoding circuit. The receiving end could also be configured with a low pass or a high pass filter. The purpose of the filter is to convert the pulse to an oscillation. With a bandpass circuit, the oscillation occurs at the resonant frequency of the bandpass filter. In a physical system, this would be like a clapper hitting a bell, or a piano key striking a piano wire.

In a biologically plausible neuron device, the dendrite structure further processes the signal with delays and gains, with intermediate summations at bifurcations, and finally a low pass summation stage at the soma portion. When the threshold is reached, this soma circuit creates an output spike.

In this invention, the recognition portion works by comparing the timed input spikes with a known sample. It does this by phase-shifting the input signals by a time delay that coordinates with a known sample. The phase-shifted signals are then summed and compared to a threshold voltage. Only when the input signals match the sample signals will the amplitudes be sufficient to meet the trigger threshold. When the output spike is generated, a pattern match has been found.

DETAILED DESCRIPTION OF THE INVENTION

Part 1—Coding, Method

For illustration, this invention is discussed in the context of coding the output of a bandpass filter bank as used in speech recognition applications. The coding could also be applied to other signals such as music, vision, etc.

Figure 1:
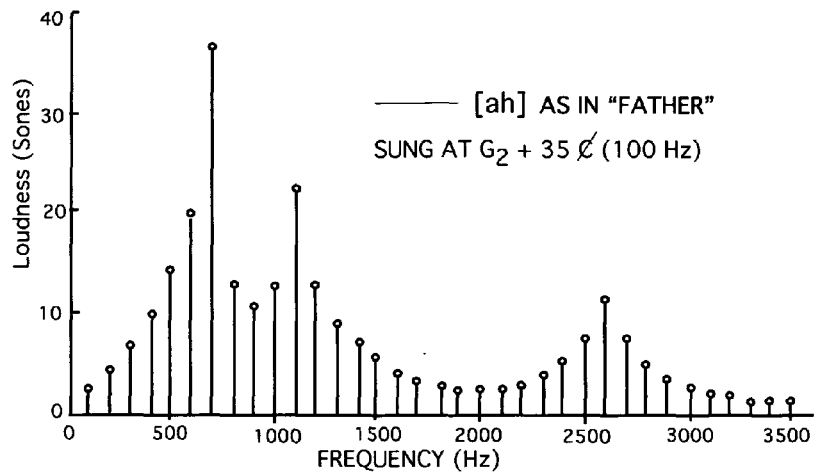
FIG. 1 as prior art is a graph showing the amplitude and frequency of the sound "ah" as in "father", sung at $G_2+35$ c (100 Hz).
Figure 2:
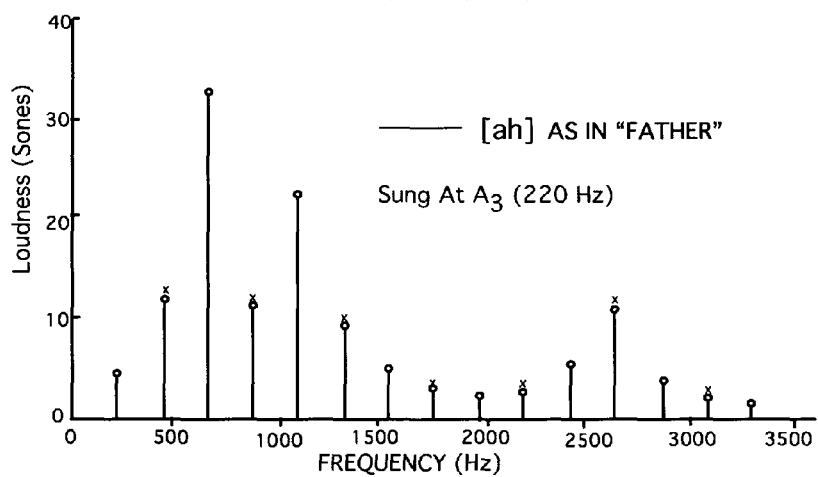
FIG. 2 as prior art is a graph showing the amplitude and frequency of the sound "ah" as in "father", sung at $A_3$ (220 Hz).
Figure 3:
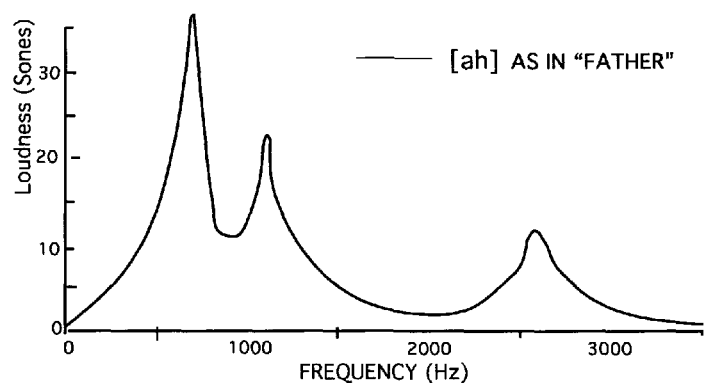
FIG. 3 as prior art is the spectral pattern of the sound "ah" as in "father".
Figure 4:
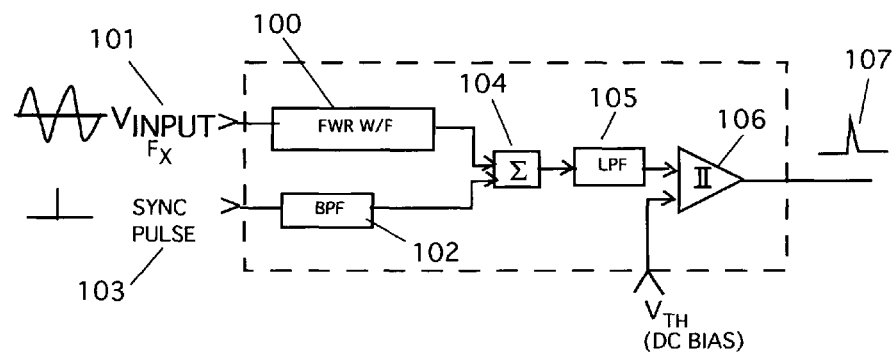
FIG. 4 is a block diagram of a neuromimetic coding device (NCD).
Figure 5:
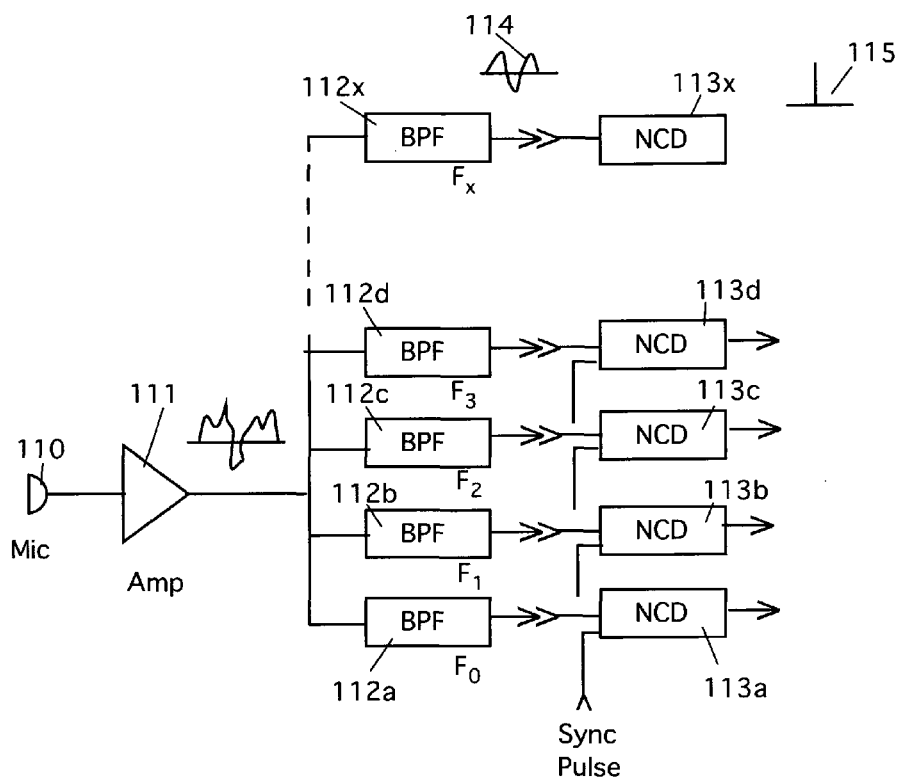
FIG. 5 is a block diagram of a bandpass filter bank feeding a bank of NCDs.

In the preferred embodiment, the coding device is an array of individual neural coding devices (NCDs) for each frequency component of the input. FIG. 4 is a block diagram of a neuromimetic-coding device (NCD). FIG. 5 is a block diagram of a bandpass filter bank feeding a bank of NCDs. FIG. 4 is a block diagram of a neuromimetic-coding device (NCD). Referring now to FIG. 4, the NCD circuit consists of Full Wave (or half wave) Rectifier with Filter 100. This portion of the circuit converts the sinusoidal input signal 101 (Vinput) to a DC signal corresponding to the amplitude of the input signal. This DC signal is actually only "DC" in the context of small time windows. A source for Vinput is the sinusoidal output of a bandpass filter, as discussed below.

A Band Pass Filter (BPF) or Low Pass Filter 102 is used to generate a rising sinusoidal shaped wave that is triggered by a Sync pulse 103. In keeping with the neural analog, the word "spike" is used instead of "pulse". The output of this stage can be referred to as Vtiming. The method of how a synchronizing spike can be generated in a neural like way is discussed below. For purposes of the NCD, sync spikes are generated by "onset" detection, and turned off after "offset" detection periods of no sound. Typical BPF response to a pulse input in this circuit is designed to produce a damped sinusoidal waveform analogous in a physical system to the clapper striking a bell or a key striking a string, for example.

A summing circuit 104 then sums the DC level with the rising sinusoidal wave. The first (rising) quarter cycle of this summed voltage is used to create a timing mechanism. This is a unique feature of this invention—the use of summing. All prior art canonical neuron models perform integration at this stage. In this biologically mimicked method, the PSP (Postsynaptic Potentials) are summed and not integrated. Note that in performing integration at this stage the prior art canonical models are essentially counting the spikes received by the neuron during a window of time. Rather than just a counting of spikes, the summing process used here produces a timed spike that is a function of the amplitude of the input signal. This feature is critical to the decoding phase as used in pattern recognition, as discussed below.

Next, a Low Pass Filter (LPF) section 105 can be used to smooth the signal. The output of this stage is referred to as Vsum. In a complex dendritic tree structure, this stage would be called a "compartment." In this method, compartments can be comprised of additional filter elements—low, all, bandpass—and thus can add many additional computational elements (delays). This factor is more important in the decoding method described below.

The next element is a voltage comparator 106, which compares Vsum with an externally set voltage threshold ($V_{TH}$).

The comparator generates an output spike when the threshold ($V_{TH}$) is crossed with a rising voltage. The output spike is the output of a Schmitt trigger-like function. The comparator does not give a constant output, only a spike 107.

As mentioned above, the first (rising) quarter cycle of the sinusoidal wave summed with the DC level creates a timing mechanism. The output voltage comparator spike generator of the circuit monitors the summed level (Vsum) until a threshold ($V_{TH}$) is met. For example, assume the circuit is built to operate between 0 and $10 V_{DC}$. Assume that $V_{TH}$ is set at 9.6V. Now, if the BPF 103 produces a (first rising quarter cycle) wave between 0 and 9.5V, and if the rectifier 100 receives no input, (i.e. $V_{IN}$ is 0), there would be no spike generated. If the output of rectifier 100 rises above 0.1V then an output spike will be triggered. For a low DC level, most of the quarter cycle is necessary for the sum of the rectifier and the BPF to reach the threshold. Thus, the amplitude of a low signal is converted to a long temporal difference between the synchronizing input spike and the threshold being met to produce an output spike. For high DC levels (representing a high amplitude), the circuit does not require as much rise time from the timing wave in order to reach the threshold. Thus, a very short time between the sync spike and the output spike represents a high amplitude signal. Note that a sawtooth or ramp type pulse could be used in lieu of the sinusoidal wave, however a sinusoidal wave appears to be more biologically plausible and the shape of the wave creates a Gaussian-like probability distribution giving more weight to higher amplitude frequency components.

Some features are important to note. First, the fact that when the input is zero, there is no output is important when a pattern of spikes is being correlated (decoded). In the decoding correlating circuit, each spike has an excitatory or inhibitory effect. The arrival of no spike has no effect. The arrival of a spike out of pattern, however, does have an inhibitory effect. The pattern generated by the NCD encodes the spectral shape of the frequency components of the broadband input signal. For speech recognition, frequency components of a voiced sound are directly related to the underlying pitch of the voice. Different speakers with different pitches can say the same thing and their recorded broadband signal would be composed of different frequencies. However, the decomposed spectral envelopes would match. Not registering an output at a frequency where there is no input is important to this correlation i.e. speaker independence.

Second, the synchronizing spike is not important to carrying the code (pattern) forward and is not used other than in synchronizing the timing waves. The output spikes' temporal relationship to each other represents the relative amplitude differences between the inputs. For example, this has importance in speech recognition as in someone speaking quietly into a microphone versus someone speaking loudly but making the same sound. The same sound has the same spectral shape loud or soft. It is also important since it allows imperfect automatic adjustment of input gain. Although absolute amplitudes can be different, the relative frequency signal amplitudes between each speaker are the same for the same sound.

Third, the pattern being carried forward can be generated asynchronously. The sync signal can be a product of some other sensory function e.g. the overall amplitude of the broadband signal being sensed. In other words, each pattern (code) generated does not need to be temporally related to the next code as is normally found in an artificial neural network or other clock based computation device. In practicality, the sync (timing activating) signal needs to be slow enough to allow the downstream decoding to take place and reset (refractory period).

The coding system in FIG. 5 puts this all together. Using the speech input application as an example, the figure shows a microphone 110 and amplifier 111 feeding a bank of bandpass filters 112a, 112b, 112c, 112d, and 112x (with x representing the final filter). For current speech recognition methods, the band pass filters can be tuned to the Mel frequency bands. There is an individual NCD circuit (113a, 113b, 113c, 113d, and 113x (see FIG. 4). which convert the amplitude output of each BPF 114 e.g., to a relative temporal spike code 115 e.g.

Figure 6:
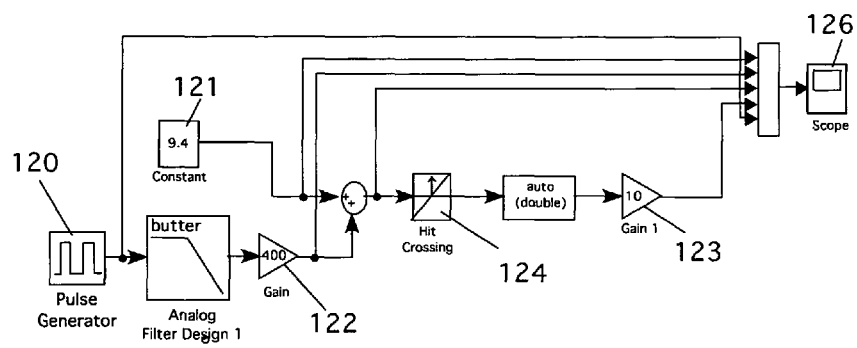
FIG. 6 is a block diagram of an NCD test setup for a simulation.
Figure 7A:
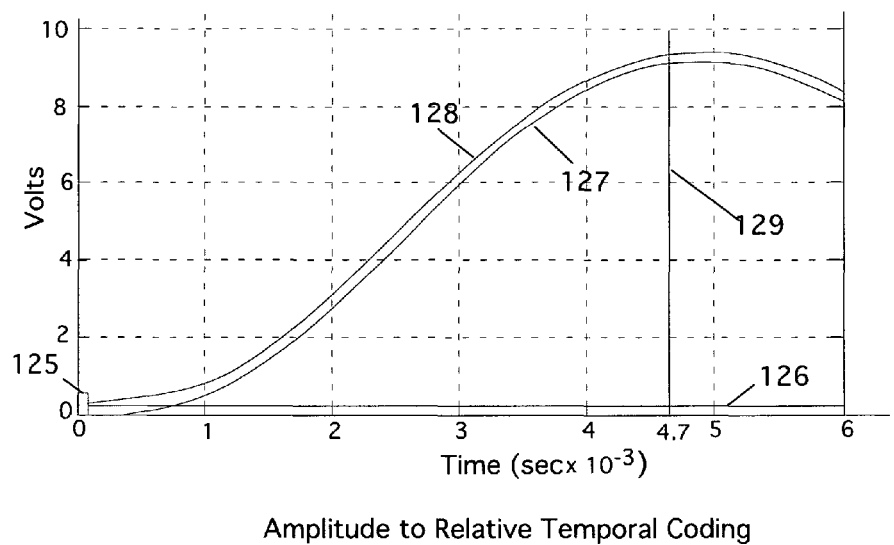
FIG. 7a is graph of various inputs and the output of the NCD test setup with the amplitude set at 0.4 v and an output spike generated at 4.7 ms.
Figure 7B:
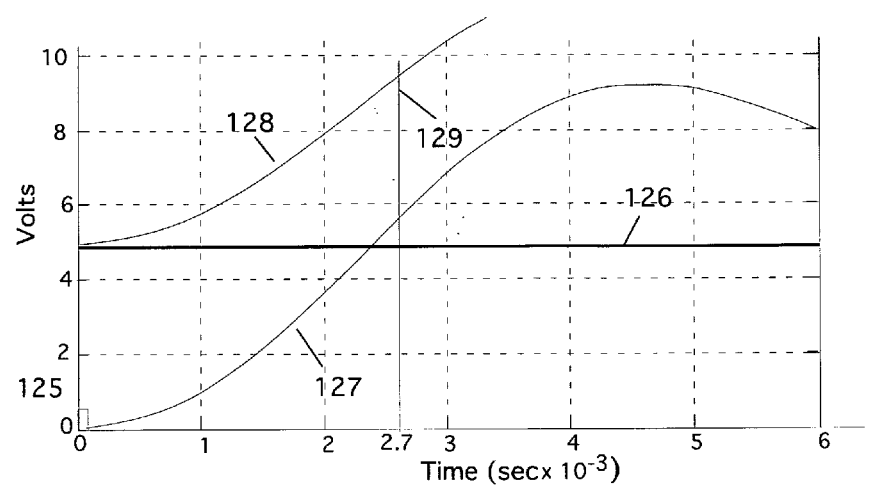
FIG. 7b is graph of various inputs and the output of the NCD test setup with the amplitude set at 4.9 v and an output spike generated at 2.6 ms.
Figure 7C:
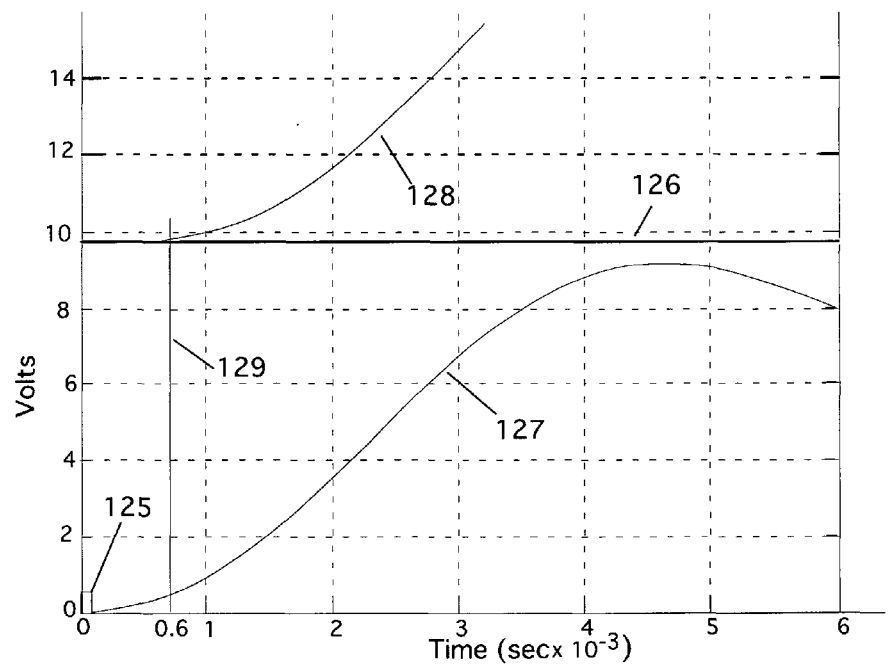
FIG. 7c is graph of various inputs and the output of the NCD test setup with the amplitude set at 9.4 v and an output spike generated at 0.6 ms.

What takes place in a single NCD can be graphically illustrated with an example of the method. FIG. 6 is a block diagram of a simulation setup. In this simulation, the sync spike was produced by the pulse generator 120; the output of the Full Wave Rectifier 100 was simulated by the constant 121 (which can be varied). Gains 122, 123 have been added to scale the values to operate on a nominal 0.1-10V range. The threshold (Hit Crossing) 124 was set at 9.4. The sync spike started at 0 ms in each run. A scope 126 was used to chart the various inputs using Scope probes that were placed at 5 locations so all values in the diagram ware indicated on the same graph (FIGS. 7a, 7b and 7c). These outputs are indicated by the following reference numbers: Sync Pulse 125, the Constant representing amplitude of frequency to be encoded 126, the Sinusoidal (timing) wave produced by sync pulse 127, the sum of 126 and 127 being 128, and the Spike triggered when threshold (set at 9.4) is reached 129.

These simulation outputs are shown in FIGS. 7a-7c. FIG. 7a is graph of various inputs and the output of the NCD test setup with the amplitude 125 set at 0.4 v and an output spike 128 generated at 4.7 ms. This graph illustrates the time delay that represents a low amplitude signal. FIG. 7b is graph of the various inputs and the output of the NCD test setup with the amplitude 126 set at 4.9 v and an output spike 129 generated at 2.6 ms. This graph illustrates the time delay that represents a medium amplitude signal. Finally, FIG. 7c is graph of various inputs and the output of the NCD test setup with the amplitude 126 set at 9.4 v and an output spike 129 generated at 0.6 ms. This represents the highest amplitude signal generating the fastest spike.

These results are indicated in the following table:

TABLE 1

Amplitude to Relative Temporal Coding as Derived from the Simulation

| Input | Amplitude | Absolute Time (MS) | Relative Time* |
|---|---|---|---|
| F0 | 0.0 | N/A | N/A |

Relative time is the time difference between the first pulse and the current pulse in the spike train.

Figure 8:
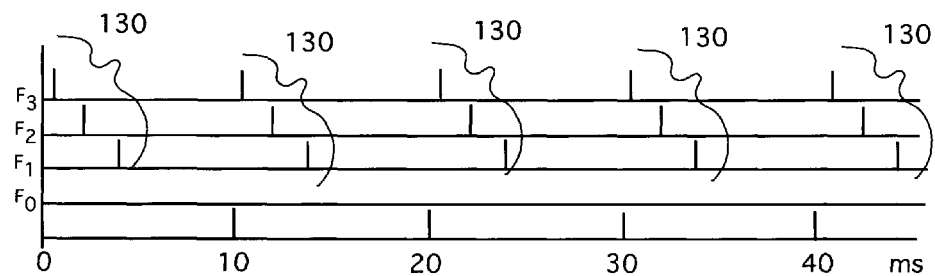
FIG. 8 is a graphical representation of a spike output train that results from the simulation of FIGS. 6 and 7a, 7b and 7c given a sync pulse every 10 ms.

FIG. 8 is a graphical representation of a spike output train 130 that results from the simulation of FIGS. 6 and 7a, 7b and 7c given a sync pulse every 10 ms. This spike train encodes the spectral pattern presented in the input stream.

Once the spike train has been created, it can be decoded to see if there is a pattern match with a known sample. This is done with the decoder as discussed below.

Part II—The Decoder.

Figure 9:
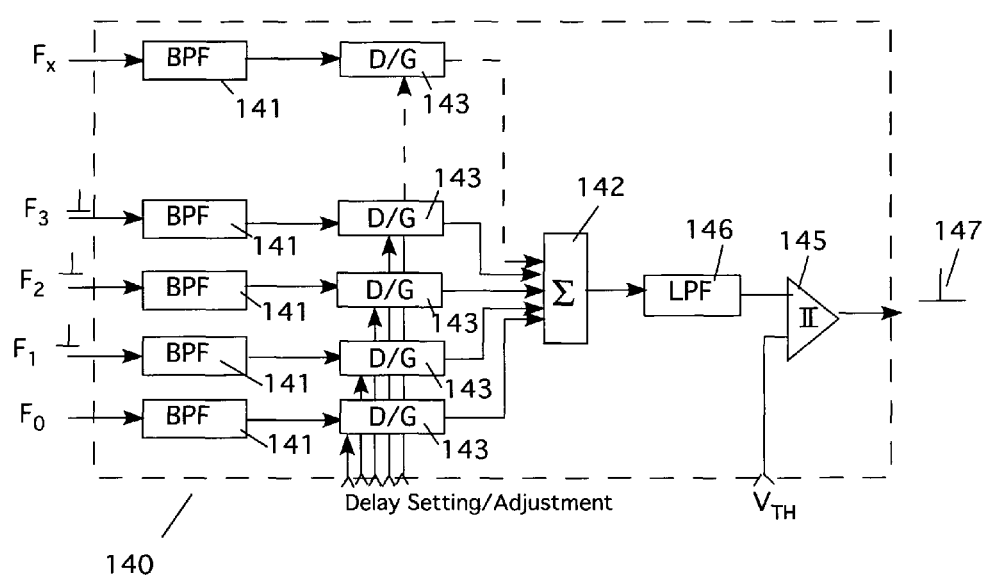
FIG. 9 is a block diagram of neuromimetic decoding device (NDD).

FIG. 9 is a block diagram of neuromimetic decoding device (NDD) 140.

The circuit starts at the synapse—dendrite distal end. Analogous to the biological neuronal arrangement described in the background material above, the pre-synaptic axon and synapse carries a nerve pulse to the synapse.

When the spike is transferred across the synapse to the dendrite, it evokes a post-synaptic potential (PSP). The electrical embodiment of this invention is similar. A multiplicity of bandpass filters are arranged like synaptic dendrite connections to receive the incoming pulses from selected outgoing lines of the coding circuit. The receiving end could also be configured with a low pass or a high pass filter. The purpose of the filter is to convert the pulse to an oscillation. With a bandpass filter circuit, the oscillation will occur at the resonant frequency of the bandpass filter. In a physical system, this would be like a clapper hitting a bell, or a piano key striking a piano wire. In a biologically plausible neuron device, the dendrite structure would further process the signal with delays and gains, with intermediate summations at bifurcations, and finally a low pass summation (as compared to prior art integration in canonical models) stage at the soma. When the threshold is reached, the soma creates an output spike.

With that in mind, the decoder circuit 140 has a number of bandpass filters 141 that correspond to the number of input signals. The BPFs 141 or (Low Pass Filters) generate a sinusoidal shaped wave triggered by an incoming spike like the damped oscillation in FIG. 10.

Figure 10:
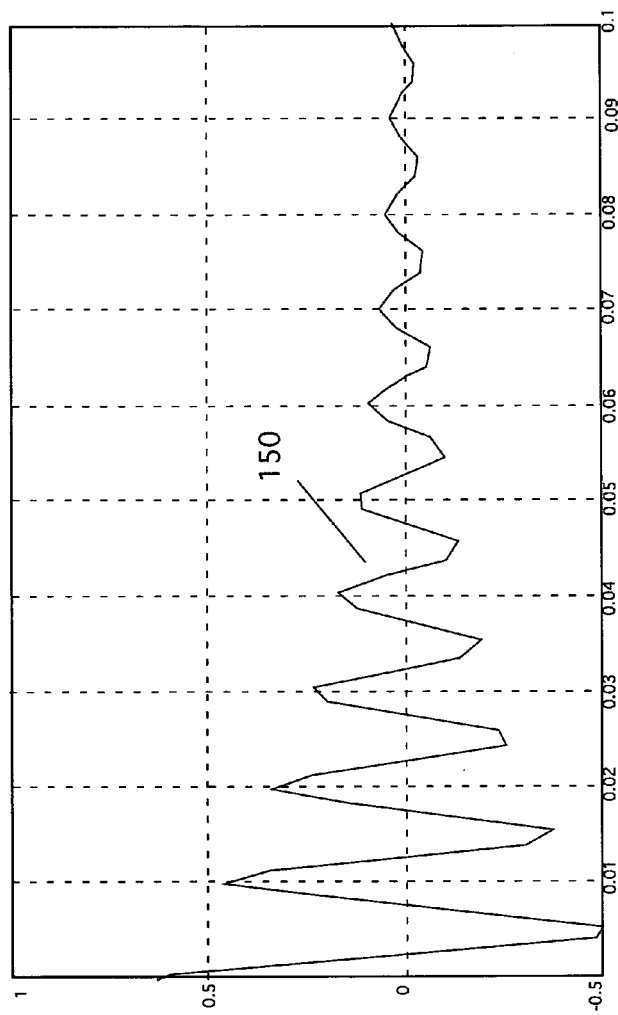
FIG. 10 is a damped oscillation, which is a typical bandpass filter response to a pulse input.

FIG. 10 illustrates what takes place in a bandpass filter circuit triggered by an impulse. In this example, a pulse is striking a Butterworth bandpass filter with a harmonic resonance of 628 rad/sec (100 Hz). This is a biologically plausible time-frame; however, this circuit can be scaled to operate at nearly any frequency. The x-axis window is set at 100 ms to illustrate the damped oscillation output 150 although the area of interest in the circuit (typical processing time-frame is 20 ms.) is generally only during the first cycle. By that time the circuit (or neuron) will have fired and reset the input, or will have subsequently damped out, not firing at all.

Note on setting the input bandpass frequency. The basic embodiment of the decoding stage of this invention is illustrated using bandpass filters all tuned to the same frequency response (for example 100 Hz). There are other situations where they could be tuned differently. For example, a slower frequency and/or higher amplitude would be a way of adding weight to any particular channel. Another example might be pulse bursting, or a series of pulses, depending on their frequency match to the filter's resonant frequency, which would enable the neuromimetic neuron device to have a frequency selective response to a rate code type input.

A summing circuit 142 sums all of the incoming oscillations. This is a unique aspect of this invention—the use of summing. As noted before, all prior art canonical neuron models perform integration at this stage. In this method, the PSP (Postsynaptic Potentials) are summed and not integrated. By performing integration at this stage, the canonical models are just counting the spikes received by the neuron during a window of time. This invention uses summing, not integration, to require that the spikes are in a specific pattern, a specific correlated time, in order for an output threshold to be met. The advantage of this is shown below.

Wave Superposition—Detailed Explanation of how the Calculation is Done.

The principle of wave superposition states that where two or more waves come together, the resulting wave is simply the sum of the components. This relationship can be observed in many natural phenomena including fluid waves, sound, and light.

This invention makes use of this principle in building the dendrite tree structure (circuit). Many neural network models assume that the dendrites have totally passive properties. Hence, all inputs are equally integrated as if they target the soma or dendrite proximal segment at the same place.

This invention does not make that assumption but instead adopts the multi-compartmental model of dendritic processes. It is well established that dendrites can be modeled with cable properties (delays). In fact, it is the very propagation delay from distal end to integrating soma, together with synaptic connections at any point, between which allow the "wave superposition" to happen as a temporal calculation.

In order to tune the neuromimetic device to respond with the desired correlation, another circuit stage is included in the distal end input. This stage is an adjustable allpass filter 143 and is used to phase shift (delay) the signal up to 180 degrees. Other types of delay circuits such as a delay line could be used. Note: it may also be necessary to add back some gain (amplifier) to equalize the circuit. The phase delay and the gain stages represent what would be "memory" in a biological circuit. The adjustability would be "learning." These stages are loosely analogous to weights in the connections of an artificial neural network.

In a complex dendritic tree structure, these stages are called "compartments." Compartments can be comprised of various filter elements—low, high, all, band-pass and thus can add many additional computational elements (delays).

This basic principle is used by this invention. Delay times are preset (fixed or adjustable) so that if the correct temporal pattern of spikes arrives at the input, each resulting oscillation is delayed by the precise amount of time to cause all oscillations to be in temporal (or phase) alignment. If the arriving pattern perfectly matches the delay, all waves line up in phase and generate the highest sum. Any wave out of phase will reduce the sum. Thus, the firing threshold is set close to the highest sum based on the degree of correlation acceptable.

In my neuromimetic device, it is not necessary to build a compartmental model with distributed synapse connections, as the delays can be introduced and set via the allpass filter stage 143. Therefore, in the electrical model all connection points can be made at the distal ends in a parallel arrangement, and their relative connection point vis-á-vis a biological model is thus set by the amount of phase delay introduced via the individual allpass filters.

The final element is a voltage comparator 145, which compares the output of stage the summer (which can be further conditioned by a Low Pass Filter 146) with the externally set voltage threshold ($V_{TH}$) and generates an output spike 147 when the threshold is crossed with a rising voltage. For illustration of this invention, a simple Schmitt trigger circuit generates the spike (pulse).

An adjustable threshold based on using an op amp voltage comparator circuit could be used to detect the threshold. Another option holds the refractory period and resets the input.

Briefly, the correlation is done by determining the temporal alignment of spikes (note this is completely different then conventional artificial neural networks whose inputs are clocked and whose values are weighted.) The inputs here are not clocked but may arrive asynchronously, which is more biologically plausible. The synaptic/dendrite connections are all similar. Even inhibitory connections are similar. Patterns that are recognized build to a threshold from the summing of a preponderance of in-phase oscillations. Out of phase oscillations have an inhibitory effect. As is biologically plausible, the effect of any spike arriving out of phase will have a major inhibitory effect on the generation of enough voltage to reach the threshold. Also biologically plausible, the effect of no spike arrival has no effect on the computation. In the case of speech recognition, an $F_0$ pitch tracking circuit could be used to dynamically adjust the threshold based on the number of frequencies expected. Because of this balance between in and out of phase superposition, and coupled with another circuit (neuron) which can adjust the threshold bias, it is possible for the neuromimetic neuron to recognize a pattern based on a small (and varying) subset of the pattern being represented.

Figure 11:
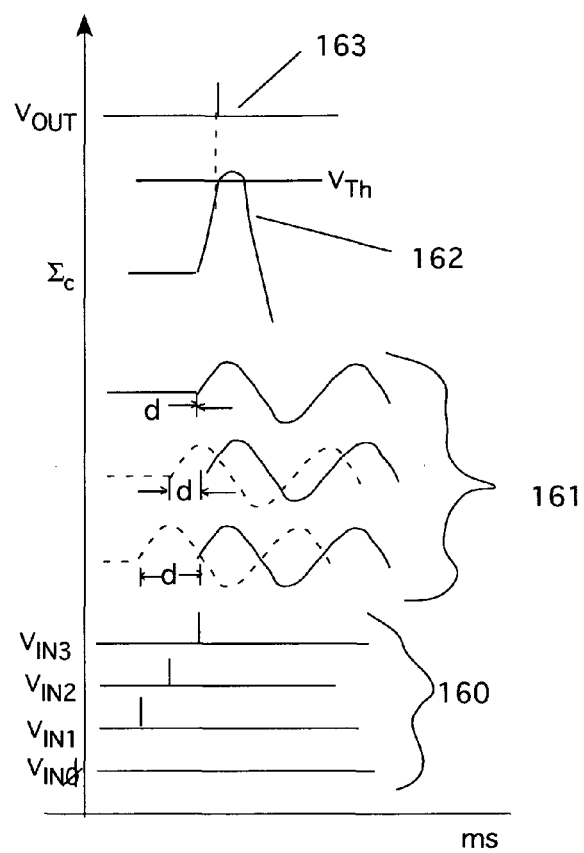
FIG. 11 is a graphical representation of the operation of the NDD given the spike train array of FIG. 8.
Figure 12:
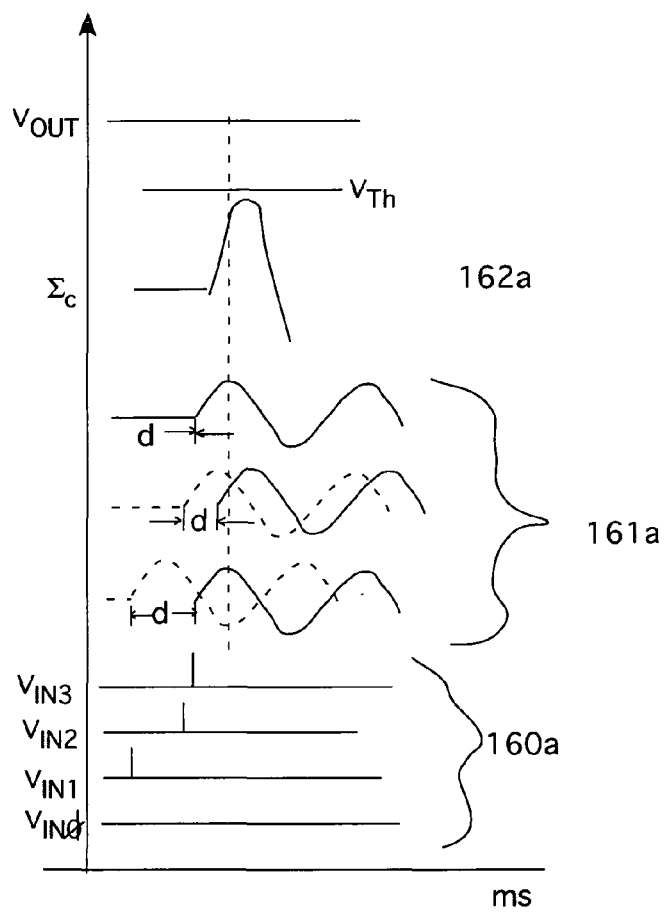
FIG. 12 is a graphical representation of the operation of the NDD given a non-matching spike train array.

The above is illustrated in FIGS. 11 and 12. FIG. 11 is a graphical representation of the operation of the NDD given the spike train array of FIG. 8. FIG. 12 is a graphical representation of the operation of the NDD given a non-matching spike train array. In FIG. 11, the bottom portion shows the spike train 160 (Vin) from FIG. 8. Above the spike train are the output signals 161 from the allpass filters 143 are shown. Note that the top wave represents the spike from $V_{in3}$, which has no delay. The second wave is from $V_{in2}$, which has a slight delay is shown phase shifted, and the bottom wave representing the longest delay is phase shifted the most. Because the signals match the pattern set in the allpass filter, the waves line up as shown. Now, when the waves are summed, the result $\Sigma_c$ 162 is shown above the threshold voltage $V_{th}$, which then produces a spike 163, shown as $V_{out}$.

FIG. 12 shows a different spike train in which the spikes do not have the same timing. Here, the waves are phase-shifted by the same delay; only in this example, the waves do not match and when added, do not cross the threshold. Consequently, no output spike is generated indicating no match was made.

Figure 13:
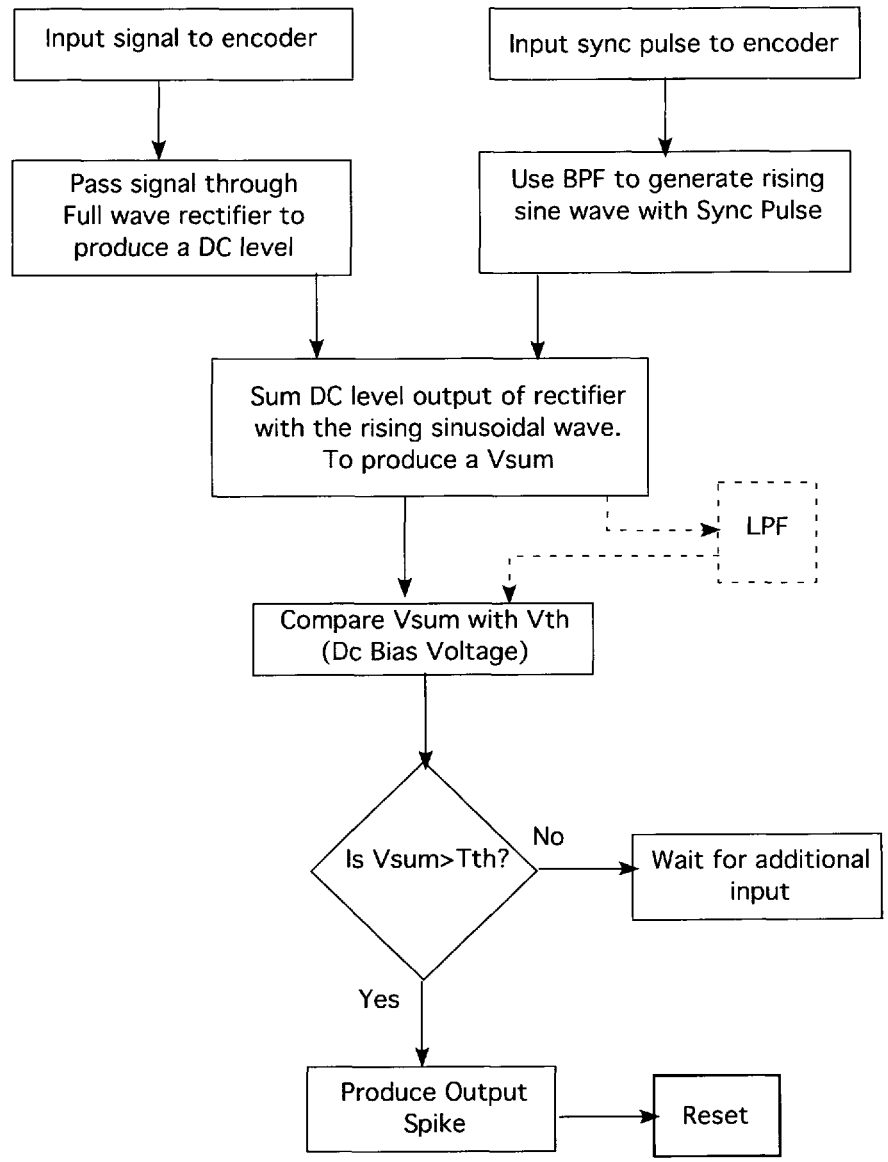
FIG. 13 is a flowchart of the encoding steps of the process.

FIG. 13 is a flowchart of the encoding steps of the process. This chart explains the steps performed in the device of FIG. 4 for what is called the NCD. At the top, it shows the dual path of signals. The input signal is passed through the full wave rectifier to produce a DC level. At the same time, a sync pulse is sent into a bandpass filter, which then generates a damped sinusoidal wave. The dc level and the damped sinusoid are the summed to produce an output voltage $V_{sum}$. The summed voltage $V_{sum}$ reflects the amplitude of the input wave as a function of time, as discussed above. The voltage $V_{sum}$ is then sent to a comparator where it is compared to a threshold voltage $V_{th}$. If $V_{sum}$ is greater than $V_{th}$, an output spike is generated; if not the system is reset for the next input wave. Note, the dashed lines indicate an optional lowpass filter, which can be inserted between the summer and the comparator to smooth the summed voltage.

Figure 14:
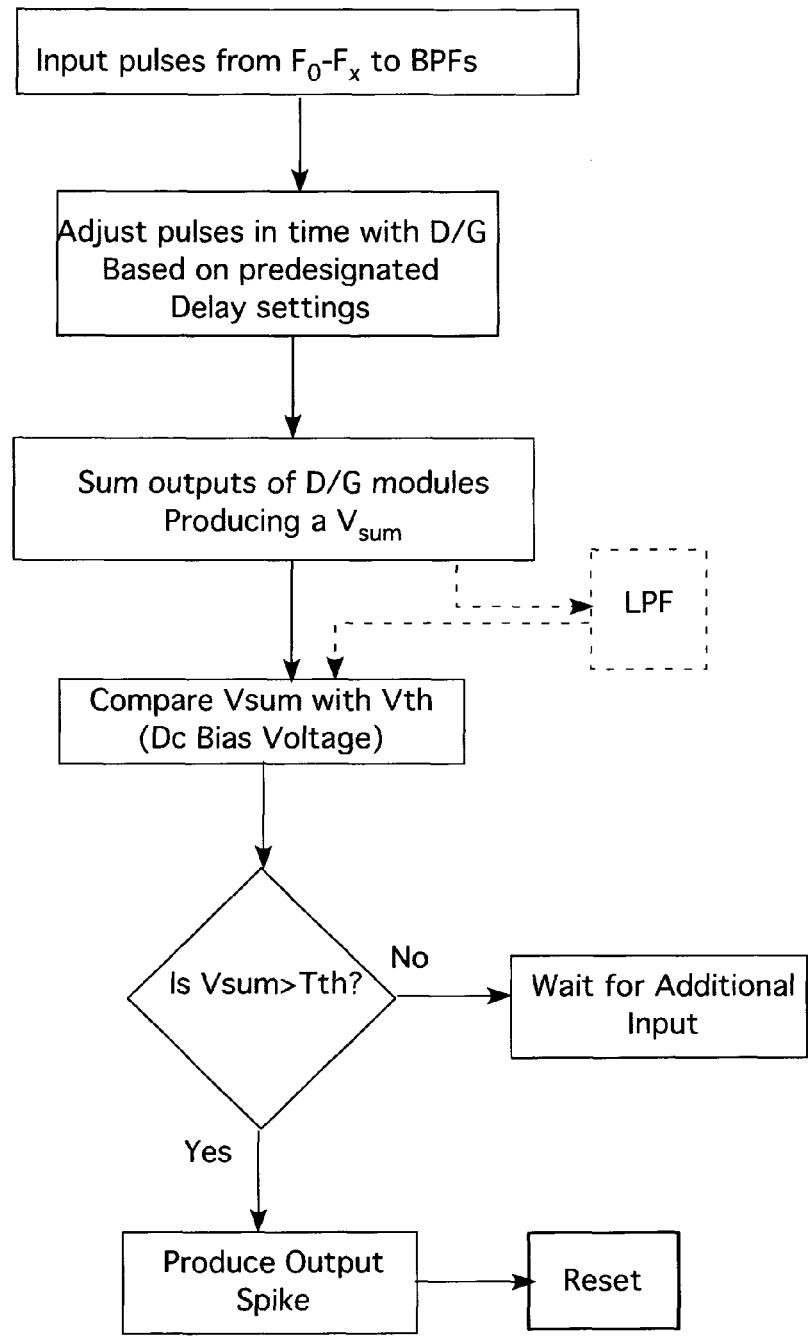
FIG. 14 is a flowchart of the decoding steps of the process.

FIG. 14 is a flowchart of the decoding steps of the process. Here, the various pulses from the encoders enter the circuit though bandpass filters. The filtered signals are then phase-shifted through a delay process based on a preset delay time. Gain can be used here, as needed. The output of the delay units are then fed as group, into a summer module that adds the amplitudes based on the time-delayed signals. Note, as before, the dashed lines indicate an optional lowpass filter, which can be inserted between the summer and the comparator to smooth the summed voltage. The summed output $V_{sum}$ is then sent to a comparator where it is compared to a threshold voltage $V_{th}$. If $V_{sum}$ is greater than $V_{th}$, an output spike is generated and resets; if not the system waits for the next input set. The threshold voltage is based on an expected output voltage based on a known source. Thus, if the threshold is reached and the output spike is generated, it indicates that the pattern being looked for has been recognized. For example, if the input signal is the "Ah" sound, discussed above, and the system was programmed to recognize the "Ah" sound, a spike would be generated.

Several circuits can be used together to view input signals with each circuit being programmed to recognize one of the phonic sounds. In this way, speech recognition can be readily done by simply monitoring the output pulses and connecting them to the proper sound in an output display.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of neuromimetic homomorphic pattern recognition by encoding selected component parts of a decomposed broadband signal comprising the steps of:
    a) passing each component input signal through a rectifier to produce a Direct Current (DC) level;
    b) passing a sync pulse through a bandpass filter, which then generates a damped sinusoidal wave;
    c) summing the DC level and the damped sinusoid to produce an output voltage $V_{sum}$;
    d) sending the voltage $V_{sum}$ to a comparator circuit;
    e) comparing the voltage $V_{sum}$ to a threshold voltage $V_{th}$; and
    f) generating an output spike when the level of the voltage $V_{sum}$ is greater than the level of the voltage $V_{th}$.

2. The method of claim 1 further comprising the step of:
    a) after step "c" and before "step "d", passing the voltage $V_{sum}$ through a lowpass filter.

3. The method of claim 1 further including a method of decoding an encoded signal comprising the steps of:
    a) passing a plurality of encoded pulses produced by a plurality of encoders though a plurality of bandpass filters producing a plurality of output signals;
    b) passing the plurality of output signals through a plurality of delay circuit modules to produce a plurality of phase-shifted signals based on a preset delay time;
    c) passing the plurality of phase-shifted signals through a summing circuit to produce an output voltage $V_{sum}$;
    d) sending the voltage $V_{sum}$ to a comparator circuit;
    e) comparing the voltage $V_{sum}$ to a threshold voltage $V_{th}$; and
    f) generating an output spike when the level of the voltage $V_{sum}$ is greater than the level of the voltage $V_{th}$.

4. The method of claim 3 further comprising the step of:
    a) after passing the plurality of phase-shifted signals through a summing circuit to produce an output voltage $V_{sum}$ and before sending the voltage $V_{sum}$ to a comparator circuit of claim 3, passing the voltage $V_{sum}$ through a lowpass filter.

5. The method of claim 3 where in step a of claim 3, the sinusoid waveforms of each of said plurality of output signals has a Gaussian like probability weight imparted to it.

6. An apparatus for neuromimetic homomorphic pattern recognition by encoding a signal comprising:
    a) a an input signal;
    b) a rectifier in operative communication with said input signal, whereby said full wave rectifier produce a DC level output;
    c) sync pulse generated with the arrival of said input signal;
    d) a bandpass filter, in operative communication with said sync pulse, whereby said bandpass filter generates a damped sinusoidal output wave;
    e) a summing circuit, having an output, in electrical communication with said full wave rectifier and said band pass filter whereby the dc level and the damped sinusoid are added to produce an output voltage $V_{sum}$ therefrom;

f) a comparator circuit, having an input and an output, in electrical communication with the output of said summing circuit; and g) a threshold voltage $V_{th}$ in operative communication with said comparator circuit;

h) whereby when the level of the voltage $V_{sum}$ is greater than the level of the voltage $V_{th}$, an output spike is generated.

7. The apparatus of claim 6 further comprising:

a) a lowpass filter, in electrical communication with the output of the summing circuit and the input to the comparator circuit.

8. The apparatus of claim 6 further including a decoding circuit comprising:

a) a plurality of encoded pulses produced by a plurality of encoders;

b) a plurality of bandpass filters in operative communication with said plurality of encoded pulses, whereby each of said plurality of bandpass filters receives one of said plurality of encoded pulses, said plurality of bandpass filters producing a plurality of output signals;

c) a plurality of delay modules in operative communication with said plurality of output signals to produce a plurality of phase-shifted signals based on a preset delay time;

d) a summing circuit, having an output, in operative communication with the plurality of phase-shifted signals said summing module producing an output voltage $V_{sum}$;

e) a comparator circuit, having an input and an output, in operative communication with the voltage $V_{sum}$; and f) a threshold voltage $V_{th}$ in operative communication with said comparator circuit;

g) whereby when the level of the voltage $V_{sum}$ is greater than the level of the voltage $V_{th}$, an output spike is generated by said comparator circuit.

9. The apparatus of claim 8 further comprising:

a) a lowpass filter, in electrical communication with the output of the summing circuit and the input to the comparator circuit.

10. The apparatus of claim 8 wherein the use of a sinusoid waveform in each of said plurality of phase-shifted signals imparts a Gaussian like probability weight to each of said plurality of phase-shifted signals.

* * * * *